United States Patent [19]

Raidel, Sr.

[11] Patent Number: 5,447,324

[45] Date of Patent: Sep. 5, 1995

[54] STABILIZED TANDEM AXLE DRIVE SUSPENSION WITH ELASTOMER SPRING IN COMPRESSION AND SHEAR

[76] Inventor: John E. Raidel, Sr., Rte. 9, Box 400-M, Springfield, Mo. 65809

[21] Appl. No.: 18,803

[22] Filed: Feb. 17, 1993

[51] Int. Cl.6 .............................................. B60G 5/00
[52] U.S. Cl. ..................................... 280/676; 280/677; 280/679; 280/681
[58] Field of Search ............... 280/676, 677, 678, 679, 280/681, 687

[56] References Cited

U.S. PATENT DOCUMENTS

| | | | |
|---|---|---|---|
| 2,427,006 | 9/1944 | Knox | 280/676 |
| 2,934,351 | 4/1960 | Masser | 280/678 |
| 3,241,856 | 3/1966 | Raidel | 280/676 |
| 3,471,165 | 10/1969 | Raidel | 280/676 |
| 3,632,128 | 1/1972 | Raidel | 280/676 |
| 4,184,698 | 1/1980 | Raidel | 280/676 |
| 4,278,271 | 7/1981 | Raidel | 280/676 |
| 4,494,221 | 1/1985 | Raidel | 280/687 |
| 4,530,515 | 7/1985 | Raidel | 280/204 |
| 5,033,769 | 7/1991 | Raidel | 280/676 |

Primary Examiner—Karin L. Tyson
Assistant Examiner—Christopher P. Ellis
Attorney, Agent, or Firm—Rogers, Howell & Haferkamp

[57] ABSTRACT

A tandem axle vehicle suspension is provided which, in variant embodiments, employs one or two torque beams each supporting an axle of a tandem axle vehicle and each pivotally connected to a load compensator where a single elastomer spring is mounted between each torque beam and compensator and is subjected to both compression and shear forces during over-the-road operation.

26 Claims, 3 Drawing Sheets

FIG. I.

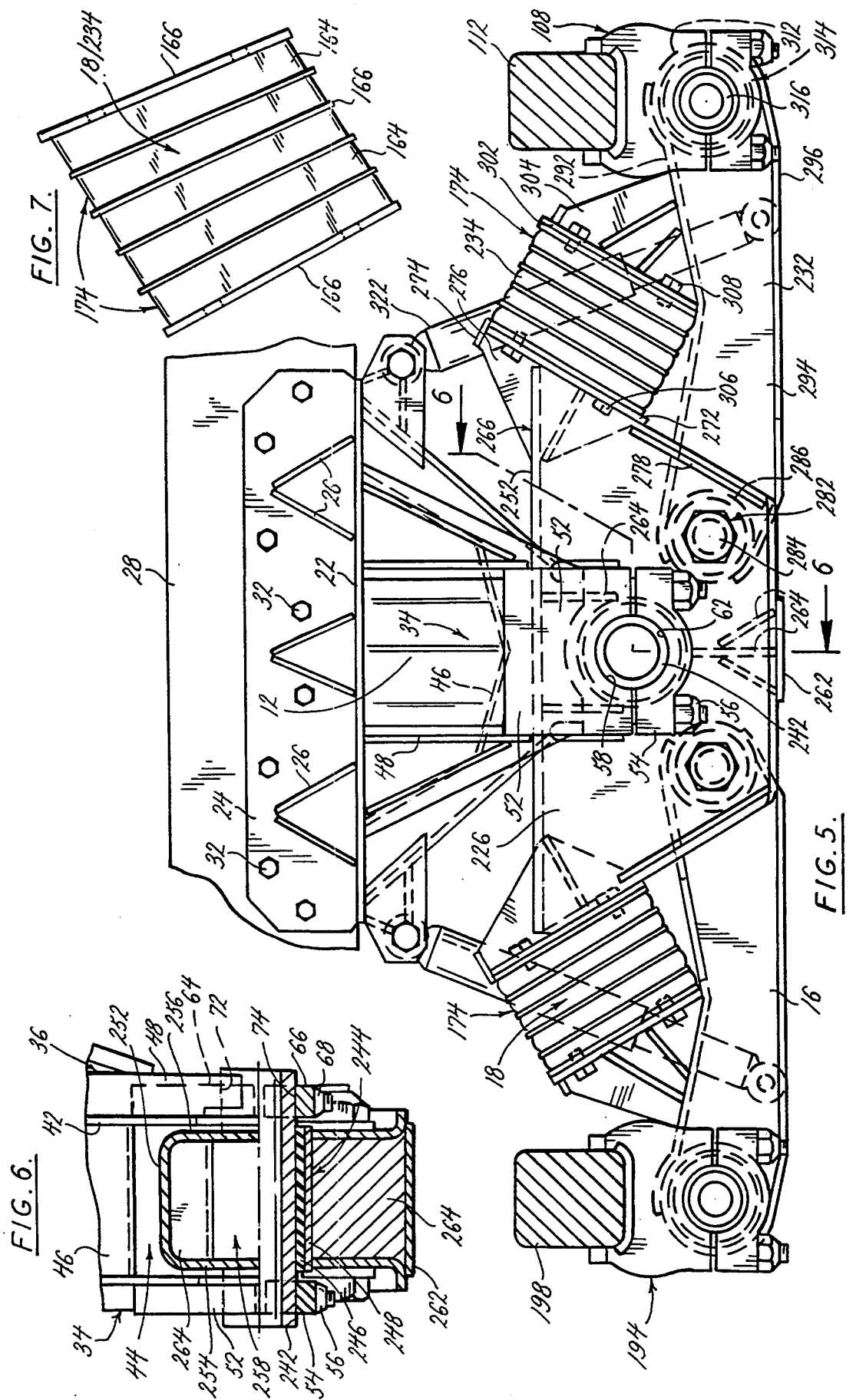

STABILIZED TANDEM AXLE DRIVE SUSPENSION WITH ELASTOMER SPRING IN COMPRESSION AND SHEAR

BACKGROUND OF THE INVENTION (1) Field of the Invention

The present invention relates to a tandem axle vehicle suspension system which, in variant embodiments, employs one or two torque beams each supporting an axle of a tandem axle vehicle where a single elastomer spring mounted on the torque beam is subjected to compression and shear forces during over-the-road operation.

(2) Description of the Related Art

A typical tandem axle suspension system of the type provided by the present invention is commonly comprised of a hanger member depending from the vehicle chassis, a load compensator pivotally supported by the hanger member, and independent forwardly and rearwardly extending torque beams each pivotally connected to the load compensator at one end and connected to the vehicle's forward and rearward axles at their opposite ends, respectively. Compressible elastic members are connected between the compensator and torque beams, with the pivotal connections of the torque beams to the compensator causing both compression and shear forces to be applied to the compressible members during over the road operations.

In a variant embodiment of prior art tandem axle vehicle suspensions, only one torque beam is connected to the load compensator for pivoting movement of the beam relative to the compensator. The compensator extends longitudinally in either a forward or rearward direction opposite to the direction that the torque beam extends from the compensator. One of the vehicle axles is mounted on the extended portion of the load compensator and the second vehicle axle is mounted on the distal end of the torque beam from the compensator. In this type of suspension system too, a compressible elastic member is mounted between the compensator and the torque beam and the pivoting movement of the torque beam relative to the compensator causes both compression and shear forces to be applied to the elastic member during over the road operations.

Examples of these prior art tandem axle vehicle suspension systems employing load compensators are disclosed in U.S. Pat. No. 3,471,165 to Raidel, U.S. Pat. No. 3,632,128 to Raidel, and U.S. Pat. No. 5,033,769 to Raidel, all assigned to the assignee of the present invention and incorporated herein by reference.

In tandem axle suspension systems employing a load compensator, the compensator is usually comprised of an inverted U-shaped channel member having a hollow interior. The torque beam or beams are connected for pivoting movement relative to the compensator by a pivot bushing assembly mounted inside the interior of the compensator. The compressible members employed with these suspensions include elastomer springs, air springs, and other conventional types of springs.

Regardless of the type of compression member employed with the suspension system, very often size limitations required that the compressible member be mounted between the compensator and torque beam or beams within the hollow interior of the compensator. The lateral width of the compensator is typically designed Just wide enough to receive one end of the torque beam or beams and the pivot bushing connecting the beam or beams to the compensator. Therefore, it was necessary that the compressible members or springs be designed with a lateral width sufficiently small to insert the compressible member within the interior volume of the compensator between the compensator and torque beam. A typical lateral width of prior art compressible members is 4 inches. However, it has been found that the positioning of the springs in the interior volume of the compensator makes it very difficult to install and remove the springs due to the limited space in the compensator interior. This makes it very difficult to perform maintenance and make repairs to the confined springs. It also makes it difficult to use the same suspension structure for various different load applications because of the difficulty in changing spring sizes in the confined area inside the compensator. Furthermore, due to the lateral size limitations placed on the springs by their being required to be positioned inside the compensator interior volume, the springs are at times inclined to buckle laterally in use. This buckling of the springs could have a detrimental effect on the axles of the vehicle. The size limitations of the springs also limit the maximum load of the vehicle that they can support.

The positioning of the compressible members between the load compensator and torque beam in the interior of the compensator was satisfactory for the compressible members resisting vertical compression forces exerted on the members as a result of pivoting movement of the torque beam or beams relative to the compensator. However, the pivoting movement of the torque beam or beams relative to the compensator also exerted a horizontal shear force on the compressible members especially when braking or accelerating, and additional structure was required to be added to the suspension systems to enhance the ability of the compressible members to resist these shear forces. One method of enhancing the ability of the compressible members to resist shear forces was to add a torque bar connected between the compressible members mounted between the load compensator and the pair of torque beams. This type of suspension system is disclosed in U.S. Pat. No. 3,471,165. However, the addition of the torque bar and its associated structure significantly increased the cost of producing suspension systems of this type and the increased structure also added to the overall weight of the system.

In suspension systems employing a load compensator with forwardly and rearwardly extending torque beams mounted thereto, a third compressible member was added to the suspension system to enhance the ability of the compressible members mounted between the load compensator and the two torque beams to resist shear forces. The third compressible member was typically mounted between a pair of brackets attached to each of the forwardly and rearwardly extending torque beams in an orientation where the third compressible member would be subjected to compression forces in response to pivoting movement of either of the two torque beams relative to the load compensator. An example of a tandem axle suspension system employing a third compressible member is disclosed in the U.S. Pat. No. 3,632,128. However, this solution to resisting shear forces also required not only the addition of the third compressible member but its associated structure connecting the third compressible member to the two torque beams. The addition of the third compressible member and its associated structure to the suspension system significantly increased the cost of producing the system and also added to the overall weight of the suspension system.

The solutions developed for resisting shear forces exerted on compressible members discussed above were not adaptable to the tandem axle suspension system of the type employing a load compensator with one of the vehicle tandem axles mounted to the compensator and a single torque beam mounted to the compensator with the second of the vehicle tandem axles mounted to the torque beam. In these types of suspension systems, in order to enhance the ability of the compressible member to resist shear forces, a secondary compressible member was mounted between the load compensator and the torque beam. This secondary compressible member was typically oriented at an angle relative to the primary compressible member mounted between the torque beam and load compensator so that the secondary compressible member was subjected to only compression forces as a result of the pivoting movement of the torque beam relative to the compensator. However, the addition of the secondary compressible member to this type of suspension system also required the addition of structure to orient the secondary compressible member in its optimum position relative to the load compensator and torque beam to resist shear forces on the primary compressible member. The addition of the secondary compressible member together with its associated structure again increased the overall cost of production of the suspension system and added to the overall weight of the suspension system.

What is needed to improve existing tandem axle vehicle suspensions employing a load compensator mounting either one torque beam or a pair of torque beams is an arrangement of the connection of the compressible member between the load compensator and the torque beam or beams where the total number of compressible members employed in the suspension system is reduced and the structure associated with the suspension system compressible members is also reduced, thereby reducing the overall cost of producing the suspension system and the weight of the suspension system. What is also needed is a mounting of a compressible member between a torque beam and load compensator where the compressible member is exposed and easily accessible, thereby enabling adjustments to be made to the suspension system to suit it to a variety of load applications by simply changing the compressible members of the system or changing the orientation of the compressible member relative to the torque beam or beams.

SUMMARY OF THE INVENTION

The tandem axle suspension system of the present invention is provided in two different embodiments with each embodiment including identical assemblies that are mounted on opposite lateral sides of a vehicle chassis.

Each of the embodiments of the suspension system employs a hanger that is attached to one side of the vehicle chassis in a position where the hanger suspends downward below the chassis. The hanger is attached to the vehicle chassis and formed in the configuration of a pair of laterally spaced columns that depend downward from the chassis. Each of the laterally spaced columns have bottom ends with brackets removably attached thereto. The brackets and bottom ends of the hanger columns are configured to receive therebetween the opposite lateral ends of a pivot trunnion assembly that extends laterally across an open void between the laterally spaced hanger columns.

Each embodiment of the suspension system also includes a load compensator, with each compensator of the two embodiments having a different configuration. The similarities between the two compensators include the compensators being formed from inverted, generally U-shaped channel members having hollow interiors. The compensators have generally rectangular cross sections with a top wall and a pair of laterally spaced sidewalls connected unitarily with the top wall and depending downward from the top wall. The compensator is received in the open void between the laterally spaced hanger columns thereby reducing the lateral width of the system. A pivot trunnion assembly is mounted in the compensator connecting the compensator to the hanger for pivoting movement of the compensator. In each embodiment of the suspension system, the load compensator extends forward and rearward of the hanger columns.

In the first embodiment of the suspension system, the rearward end of the load compensator extends longitudinally from the hanger columns to a lateral sleeve mounted at the rearward distal end of the compensator. A pivot bushing assembly is mounted in the sleeve and an axle seat assembly is mounted to the opposite lateral ends of the pivot bushing assembly. The rear axle of the tandem axle vehicle is mounted on the axle seat assembly. A single torque beam is pivotally connected to the compensator forward end. The torque beam is configured with a lateral sleeve at its rearward end, and a pivot bushing assembly is inserted through the sleeve and is mounted between the compensator's sidewalls pivotally connecting the torque beam to the forward end of the compensator. A second lateral sleeve is provided at the forward end of the torque beam and a second pivot bushing assembly is secured in the second sleeve. A forward axle seat assembly is mounted to the pivot bushing assembly and a drive axle of the vehicle is mounted on the forward axle seat assembly.

A single elastomeric spring is provided between the torque beam and the forward end of the load compensator. In the preferred embodiments of the invention, the spring is comprised of a plurality of metal plates separated by rubber blocks with each block having a general trapezoidal configuration. The spring is attached to the top surface of the torque beam and extends upward and rearward at an angle relative to the torque beam longitudinal axis to the forward end of the load compensator where it is attached to the compensator positioned entirely outside the interior volume of the compensator. The positioning of the spring entirely outside the interior volume of the compensator enables it to have a wider lateral width than the compensator interior volume thereby enabling the suspension system to be modified with a variety of different size springs for varying load applications with no lateral width limitations being placed on the springs. Furthermore, the trapezoidal configuration of the spring rubber blocks and the positioning of the spring at an angle relative to the longitudinal axis of the torque beam and the longitudinal axis of the vehicle chassis enables the spring to better resist compression and shear forces exerted on the spring due to pivoting movement of the torque beam relative to the compensator without the need for providing the suspension system with the addition of torque rods or secondary springs which were required by prior art compensator type tandem axle vehicle suspensions. The configuration of the spring blocks, the angled orientation of the spring relative to the vehicle and torque beam longitudinal axes, together with the increased lateral width dimensions of the spring enabled by its being positioned entirely outside the interior volume of the load compensator enable the single spring to perform the functions that heretofore have been performed by both a primary and secondary spring assembled between the torque beam and compensator or a primary spring and torque rod. With the springs being exposed and easily accessible, the number of rubber blocks in the springs, the size and configuration of the blocks, and the angular orientation of the spring relative to the torque beam can all easily be changed to suit the same suspension system for use in a variety of different load applications.

In the second embodiment of the tandem axle vehicle suspension of the present invention the load compensator has a symmetrical construction on opposite sides of a lateral, vertical plane extending through the center of the hanger columns. In this embodiment of the invention, the suspension system employs a forwardly extending torque beam as in the first described embodiment, and in addition a rearwardly extending torque beam. The structure of the rearward end of the compensator and the rearwardly extending torque beam, and the pivoting connection of the rearward torque beam to the load compensator are identical to the structure of the forward torque beam and forward end of the compensator of the first embodiment of the suspension system described above. In this second embodiment, the rearward extending torque beam is also provided with an elastic spring mounted between the top surface of the torque beam and the rearward end of the load compensator. The spring is also positioned at an angle relative to the longitudinal axes of the rearward torque beam. It is connected between the load compensator and the rearward torque beam entirely outside the interior volume of the compensator, enabling the spring to have lateral width dimensions larger than the lateral width dimensions of the compensator interior and enabling the same adjustments or changes to the springs as the first described embodiment that suit the same suspension system for use in a variety of different load applications. The configuration of the spring blocks and the increased dimensions of the spring enable it to resist both compression and shear forces exerted on the spring due to pivoting movement of the rear torque beam relative to the compensator without the need for a secondary spring or a torque rod as was necessary in prior art suspension systems employing load compensators.

In both embodiments of the suspension system of the invention described above, the unique design of the elastomeric spring and its orientation relative to the torque beam or beams and the load compensator enables the embodiments of the suspension system to be constructed with fewer structural parts than prior art suspension systems thereby reducing their cost of production and their overall weight.

BRIEF DESCRIPTION OF THE DRAWING

Further objects and features of the present invention are revealed in the following detailed description of the preferred embodiment of the invention and in the drawing figures wherein:

FIG. 5 is a side elevation view of the second embodiment of the tandem axle suspension system of the present invention;

FIG. 6 is a forward elevation view, in section, taken along the line 6—6 of FIG. 5; and FIG. 7 is a side elevation view of the elastomeric spring of the invention removed from the two embodiments of the suspension.

DETAILED DESCRIPTION OF THE PREFERRED EMBODIMENTS

Figure 1:
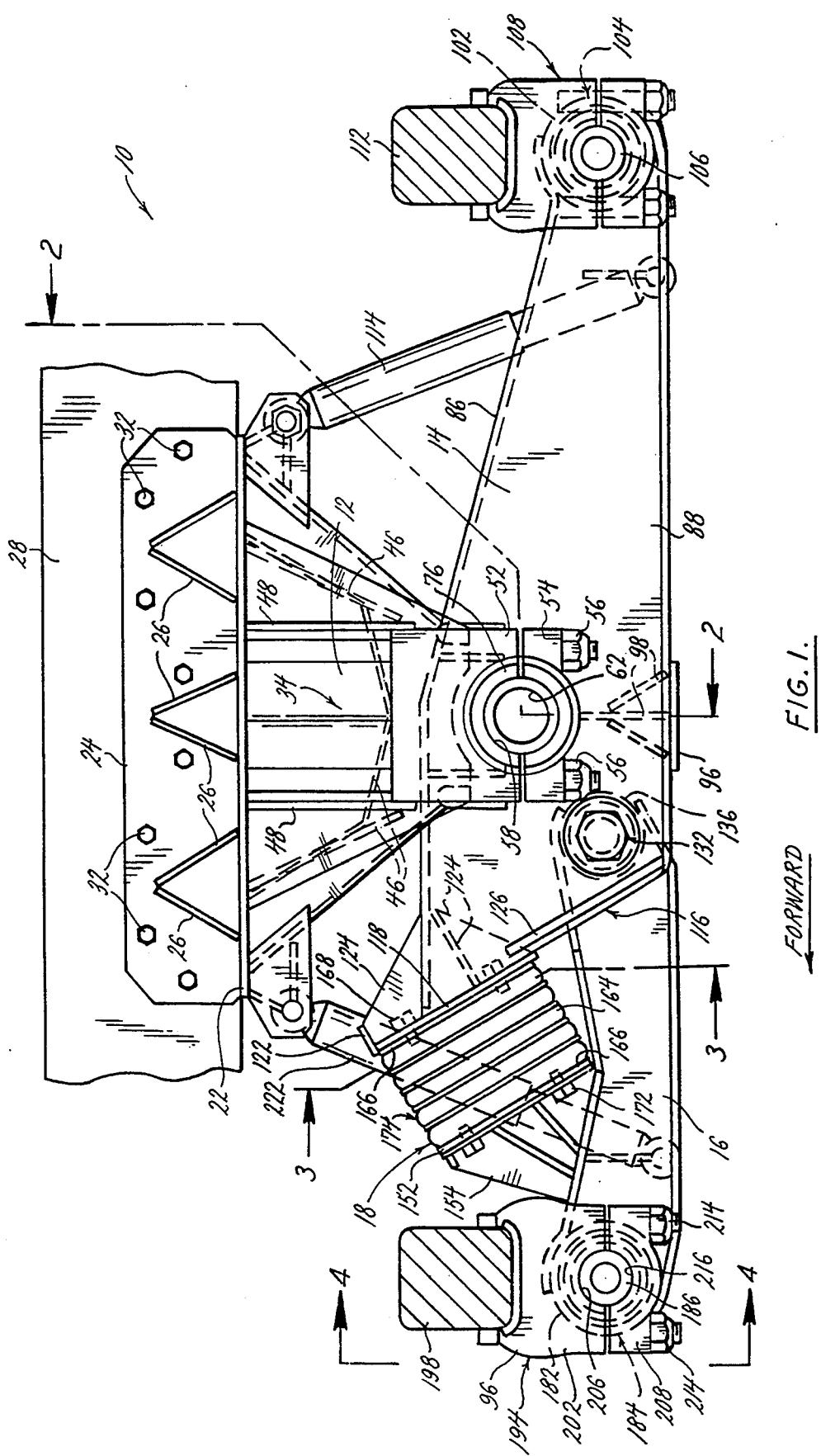
FIG. 1 is a side elevation view of the first embodiment of the tandem axle suspension system of the present invention.

The tandem axle suspension system of the present invention is an improvement over prior art load compensator suspension systems of the type disclosed in U.S. Pat. No. 3,471,165, No. 3,632,128, and U.S. Pat. No. 5,033,769, all of which are incorporated herein by reference. The suspension system is provided in two different embodiments with each embodiment including identical assemblies that are mounted on opposite lateral sides of a vehicle chassis. Because the suspension system assemblies are identical and to simplify the description of the invention, only one suspension assembly of each embodiment is described herein, it being understood that an identical assembly is mounted to the vehicle chassis on its opposite lateral side.

Furthermore, each of the embodiments of the suspension system of the invention are described with reference to forward and rearward directions of the vehicle to which the systems are attached. The references to a forward and rearward directions are employed in describing preferred modes of the invention and should not be interpreted as limiting. It should be understood that component parts of the systems described as supporting forward and rearward tandem axles of a vehicle may also be employed in the reverse, supporting rearward and forward axles of the vehicle. Moreover, in the description to follow, each of the tandem axles of the vehicle are described as drive axles. It should be understood that this description is not intended to be limiting and that the suspension systems of the invention may be employed with tandem axle vehicles having only one drive axle and a tag axle or with two tag axles.

The two embodiments of the suspension system of the present invention both generally are comprised of a hanger, a load compensator, one or more torque beams, and one or more elastic members, the number of elastic members being equal to the number of torque beams.

In the first embodiment of the suspension system of the invention 10 shown in FIGS. 1–4, the system is generally comprised of a hanger 12, a load compensator 14, a torque beam 16, and an elastic member or elastomeric spring 18.

The hanger 12 has the general configuration of a trapezoidal box with a horizontal base plate 22 provided at a top portion or section of the box. A connector plate 24 is attached to the base plate 22 and extends generally upward from the base plate. A plurality of reinforcing webs or gussets 26 are connected between base plate and connector plate. The connector plate 24 is secured to a longitudinally extending beam 28 of the vehicle chassis by a plurality of nut and bolt fastener assemblies 32. Alternatively, or in addition to the fastener assemblies, the base plate 22 and connector plate 24 of the upper portion of the hanger 12 may be welded to the vehicle chassis beam 28.

Figure 2:
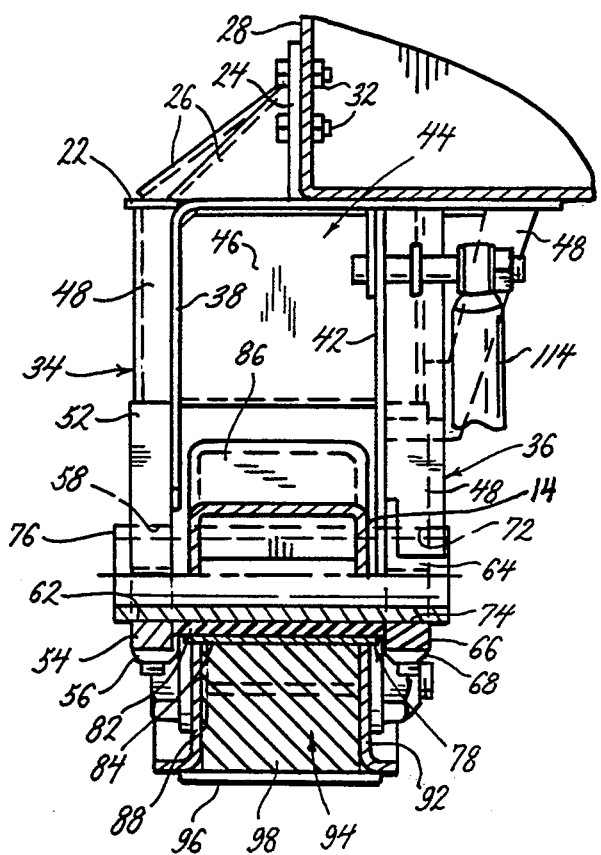
FIG. 2 is a forward elevation view, in section, taken along the line 2—2 of FIG. 1.

The lower or bottom portion of the hanger 12 is formed as a pair of downwardly depending outboard 34 and inboard 36 hanger columns. The outboard hanger column 34 is shown to the left in FIG. 2 where it is positioned laterally outboard or toward the outside of the vehicle chassis. The inboard hanger column 36 is shown to the right in FIG. 2 where it is positioned laterally inboard of or toward the center of the vehicle chassis. The outboard and inboard columns are formed by a pair of laterally spaced, longitudinally extending plates 38, 42 that depend downward from the hanger base plate 22. As is best seen in FIG. 2, the plate 38 of the outboard column 34 is bent in an L-shape and a top portion of the plate forms a portion of the hanger base plate 22. The plate 42 of the inboard column 36 is welded along its top edge to the bent portion of the outboard plate 38 and depends downward therefrom. Each of the plates 38, 42 are spaced laterally from each other forming an open void 44 between the laterally spaced plates. Reinforcing webs 46 are welded between the outboard and inboard plates 38, 42 in the lateral void 44 and enhance the structural strength of the lower portion of the hanger 12. Additional web members 48 are secured to the surfaces of the outboard plate 38 and inboard plate 42 opposite the lateral void 44 and to the underside of the base plate 22 to increase the structural strength of the hanger lower section.

An upper portion of a trunnion block 52 is secured to the exterior surface of the outboard plate 38 and a lower portion of a trunnion block 54 is secured to the upper portion by a pair of threaded fasteners 56. A lower surface of the upper trunnion block portion 52 has a semi-circular indentation 58 formed therein. The top surface of the trunnion block lower portion 54 also has a complementary, semi-circular indentation 62 formed therein. The configurations of the two block portion indentations 58, 62 are designed to accept an outboard end of a pivoting trunnion of the load compensator 14 to be described. An upper portion of a trunnion block 64 is also secured to the exterior surface of the inboard plate 42. A lower portion of a trunnion block 66 is secured to the upper portion by a pair of threaded fasteners 68. The upper block portion 64 has a semi-circular indentation 72 formed in its bottom surface. The lower block portion 66 also has a semi-circular indentation 74 formed in its upper surface, the configurations of the two semi-circular indentations 72, 74 being complementary and being dimensioned to receive the inboard end of a pivot trunnion assembly of the load compensator 14 to be described.

The upper and lower portions of the trunnion blocks secure a trunnion pivot pin or shaft 76 to the lower end of the hanger 12 extending laterally across the open void 44 between the hanger columns 34, 36. The trunnion shaft 76 is shown as a hollow tubular element but may also be a solid cylindrical shaft. A trunnion pivot bushing 78 is mounted on the trunnion shaft 76 intermediate the hanger columns 34, 36. The trunnion pivot bushing 78 is comprised of a rubber bushing 82 surrounding the trunnion shaft 76, and a metal sleeve or housing 84 surrounding the rubber bushing. As is best seen in FIG. 2, the opposite outboard and inboard ends of the trunnion shaft 76 are secured against rotation between the upper trunnion block portions 52, 64 and lower trunnion block portions 54, 66 which are tightened around the trunnion shaft ends by the respective threaded fasteners 56, 68.

The load compensator 14 is secured to the exterior surface of the trunnion bushing sleeve 84 for pivoting movement about the center axis of the trunnion shaft relative to the hanger 12. As is best seen in FIG. 2, the compensator 14 is comprised of a generally rectangular shaped channel member formed in an inverted U-shape configuration. The compensator includes a top wall 86 and an outboard sidewall 88 and inboard sidewall 92 that enclose a hollow interior volume 94 of the compensator. A bottom wall section 96 is welded across the out turned bottom edges of the compensator sidewalls 88, 92 and adds structural rigidity to the compensator. A plurality of reinforcing webs 98 are secured in the interior 94 of the compensator to the compensator bottom wall 96 and the mutually opposed faces of the compensator sidewalls 88, 92. The compensator sidewalls 88, 92 are secured on the trunnion pivot bushing sleeve 84 with the sleeve extending through coaxial openings (not shown) in the sidewalls. The rearward end, or right hand end of the load compensator 14 as viewed in FIG. 1, converges toward and is welded to the exterior surface of a tubular sleeve 102. The sleeve 102 is hollow with a lateral center axis and a bushing assembly 104 is secured in the interior of the sleeve. The bushing assembly 104 is conventional and includes a center pivot pin 106 that projects from opposite lateral sides of the bushing and opposite lateral ends of the compensator sleeve 102. A rear axle seat assembly 108 is secured to the opposite lateral ends of the bushing pivot pin 106 and supports the rear axle 112 of the tandem axle vehicle thereon. The axle seat assembly 108 is substantially identical to that supporting the front axle of the tandem axle vehicle and the details of the axle seat assembly will be described with reference to the front axle seat assembly to follow. The rear axle seat assembly 108 supports either a tag axle or a drive axle 112 of the tandem axle vehicle. Although not shown, a torque rod may be assembled between the rear axle 112 and the vehicle chassis 28 with opposite ends of the torque rod pivotally connected to the axle and chassis. The torque rod, as is conventional, maintains the relative orientation of the axle 112 to the vehicle chassis 28 substantially constant as the drive axle moves vertically and the compensator 14 pivots about the trunnion shaft 76 due to the vehicle being driven over uneven road surfaces.

A shock absorber 114 is pivotally connected to the load compensator 14 and the hanger 12. A lower end of the shock absorber is connected to the inboard sidewall 92 of the compensator adjacent the rearward axle seat 108. The upper end of the shock absorber 114 is connected to a bracket secured to the inboard plate 42 of the inboard hanger column 36. The connections of the shock absorber between the compensator and hanger are conventional.

The forward end 116 of the load compensator 14, or the left hand end as viewed in FIG. 1, also has the same General inverted U-shaped configuration as the entire longitudinal length of the compensator. The configuration of the compensator forward end allows access to the interior 94 through the open forward end. In the preferred embodiment of the compensator, the forward edges of the compensator outboard 88 and inboard 92 sidewalls are oriented at about a 60° angle relative to the compensator top wall 86 adjacent the forward end. The forward edges of the compensator sidewalls 88, 92 are also oriented at about a 60° angle relative to the longitudinal axis of the vehicle or chassis member 28.

A compensator reaction plate 118 is welded to the front edge of the compensator top wall 86 and sidewalls 88, 92 at an angular orientation relative to a horizontal plane passing through the suspension assembly 10. The angular orientation of the reaction plate 118 relative to the horizontal plane passing through the suspension can be varied to adjust the load which the suspension is capable of comfortably supporting as will be explained. A reinforcing flange 122 is secured across the top edge of the reaction plate 118 and a plurality of reinforcing webs or gussets 124 extend between the reaction plate 118 and the top wall and sidewalls of the compensator 14. Additional reinforcing webs 126 are secured to the sidewalls 88, 92 of the compensator adjacent the forward compensator end 116 and together with the reaction plate 118, the lateral flange 122, and the plurality of webs 124 reinforce and strengthen the forward end of the compensator.

A torque beam pivot bushing assembly 132 is secured between the outboard 88 and inboard 92 compensator sidewalls just forward of and below the compensator trunnion shaft 76. The torque beam pivot bushing assembly 132 is conventional and is secured between the compensator sidewalls by a bolt and nut fastener assembly 134 inserted through coaxial holes provided in the outboard and inboard 88, 92 compensator sidewalls. The bushing assembly 132 includes a cylindrical metal interior sleeve (not shown) mounted on the nut and bolt fastener 134 extending between the compensator sidewalls. A cylindrical rubber bushing (not shown) is mounted around the interior sleeve and an exterior metal sleeve 136 is mounted around the rubber bushing.

The torque beam is comprised of a top wall 142, opposite outboard 144 and inboard 146 sidewalls, and a bottom wall 148. The rearward ends of the torque beam sidewalls 144, 146 and the rearward ends of the torque beam top wall 142 and bottom wall 148 are secured to the exterior metal sleeve 136 of the torque beam bushing assembly 132 thereby providing a pivoting connection between the torque beam and the load compensator in the interior volume 94 of the compensator.

An inclined torque beam reaction plate 152 is secured to the torque beam in an inclined orientation relative to the torque beam top wall 142 by a plurality of web members 154 welded between the underside of the reaction plate and the top wall of the torque beam. The torque beam reaction plate 152 is oriented an angle relative to a horizontal plane passing through the centers of the pivot mountings of the rear axle seat 108, the torque beam 132, and the forward axle seat yet to be described. The angular orientation of the reaction plate 152 relative to the horizontal plane can be varied to adjust the suspension system for use with a variety of different load applications as will be explained.

Figure 3:
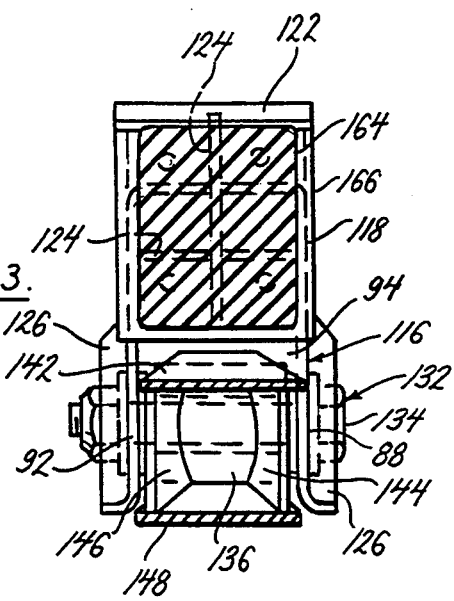
FIG. 3 is a rearward elevation view, in section, taken along the line 3—3 of FIG. 1.
Figure 4:
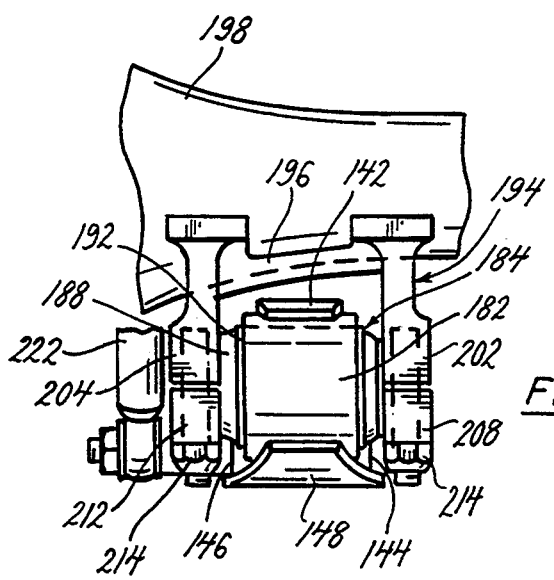
FIG. 4 is a rearward elevation view taken along the line 4—4 of FIG. 1.

The spring 18 is secured between the compensator reaction plate 118 and the torque beam reaction plate 152. In the preferred embodiment of the invention, the spring 18 is an elastomeric spring comprised of a plurality of rubber blocks 164 separated by a plurality of metal plates 166. The rubber blocks are reinforced with the metal plates to give the spring added shear strength. The top most metal plate of the spring is secured to the reaction plate 118 of the compensator by a plurality of nut and bolt threaded fasteners 168 that extend through aligned holes (not shown) provided in both plates. The bottom most metal plate of the spring 18 is secured to the torque beam reaction plate 152 by a plurality of nut and bolt threaded fasteners 172 extending through aligned holes (not shown) in the two plates. As is best seen in FIG. 3, the plurality of metal plates 166 and rubber blocks 164 of the elastomeric spring 18 give the spring a lateral width that is larger than the lateral width of the compensator interior volume. However, the spring lateral width dimensions may be varied to suit the particular load application of the suspension. By the spring 18 being positioned entirely outside the interior volume of the compensator 14, the width dimensions of the spring may be increased to enhance the ability of the spring to resist large compression and shear forces. By orienting the spring at an angle relative to a horizontal plane passing through the centers of the suspension system pivot bushing assemblies, the load on the spring may be adjusted so that the spring 18 is loaded by approximately 50% compression forces and 50% shear forces during over-the-road operations of the suspension system 10 if so desired for a particular application.

As shown in FIG. 1 of the drawing figures, the elastomeric spring 18 is subjected to compression loads and appears to have a generally rectangular configuration. The configuration of the spring when not subjected to compression or shear loads is shown in FIG. 7 of the drawing figures. In this figure it can be seen that the spring 18 has an overall trapezoidal configuration with each of the rubber blocks 164 being shaped differently. The orientation of the spring shown in FIG. 7 is the same as that shown in FIG. 1 with the metal plate 166 appearing to the left in FIG. 7 being the metal plate attached to the torque beam reaction plate 152 in FIG. 1, and the metal plate 166 shown to the right in FIG. 7 being the metal plate attached to the compensator reaction plate 118 shown in FIG. 1. The configuration of the elastomeric spring 18 shown in FIG. 7 provides additional resilient material at the top ends 174 of the spring rubber blocks 164 which are spaced at a greater radial distance from the pivot connection of the torque beam 16 to the load compensator 14 provided by the pivot bushing assembly 132. This configuration of the rubber blocks 164 enables the elastomeric spring 18 to provide a greater resistance to compression and shear forces during operation of the suspension assembly 18 over-the-road. With the spring 18 installed in its operative position between the torque beam reaction plate 152 and the load compensator reaction plate 118, and supporting the vehicle load, the spring assumes the general rectangular configuration shown in drawing FIG. 1. Although a particular spring with a particular configuration and number of rubber blocks 164 and a particular number of plates 166 is shown, the spring is easily changed by varying the material of the rubber blocks, their configuration or number, and the number of metal plates to best suit the suspension system for any particular load application.

The novel configuration of the elastomeric spring 18, together with the novel configuration of the hanger 12, load compensator 14, and the torque beam 16, enable the suspension system of the invention 10 shown in FIG. 1 to be constructed with the single elastomeric spring 18 between the compensator and torque beam and thereby enable the suspension system to be constructed of fewer component parts than prior art suspension systems which in turn reduces the cost of producing the suspension system and reduces its overall weight. Moreover, the suspension system of the invention can be easily adjusted by replacing the exposed, easily accessible spring 18 with a variety of different springs in a variety of angular orientations as set forth above.

The forward end of the torque beam 16 opposite its pivot bushing connection to the compensator 14 is connected with a hollow tubular sleeve 182 having a center axis oriented laterally relative to the vehicle chassis. A pivot bushing assembly 184 is inserted in the interior of the sleeve 182 with opposite lateral ends of a pivot pin 186 of the bushing assembly projecting from the opposite lateral ends of the sleeve. The bushing assembly 184 is conventional and is comprised of an interior metal sleeve (not shown) surrounding the pivot bushing pin 186, a cylindrical rubber bushing 188 surrounding the interior metal sleeve, and the exterior metal sleeve 192 surrounding the rubber bushing.

A forward axle seat assembly 194 is secured to the opposite lateral ends of the pivot bushing pin 186 projecting beyond the opposite lateral ends of the forward torque beam sleeve 182. The axle seat assembly 194 is comprised of a base 196 that conforms to the shape of the forward drive axle 198 of the vehicle and is welded thereto. A pair of laterally spaced legs 202, 204 depend downwardly from the axle seat base 196 and have semi-circular indentations 206 formed in their bottom surfaces. A pair of brackets 208, 212 are secured to the bottom surfaces of the axle seat legs 202, 204 respectively, by threaded fasteners 214. The brackets 208, 212 have semi-circular indentations 216 formed in their top surfaces. The semi-circular indentations 206, 216 of the axle seat legs and axle seat brackets are configured to fit around the opposite lateral ends of the pivot bushing pin 186 and securely hold the pivot bushing between the axle seat legs and brackets by tightening down the fasteners 214. In this manner, the forward axle seat assembly 194 supports the forward axle 198 of the tandem axle vehicle on the forward end of the torque beam 16 by the pivot bushing connection between the axle seat and torque beam. As stated earlier, the construction of the rearward axle seat 108 and the manner in which it supports the rear axle 112 on the rearward end of the compensator 14 is substantially identical to that of the forward axle seat assembly 194.

A second shock absorber 222 is pivotally connected to the torque beam 16 and the hanger 12. A lower end of the shock absorber 222 is connected to the inboard sidewall 146 of the torque beam 16 adjacent its connection to the forward axle seat assembly 194. The top end of the shock absorber 222 is connected to a shock absorber bracket secured to the hanger 12. The pivoting connections of the opposite ends of the shock absorber 222 between the torque beam 16 and hanger 12 are conventional.

In the second embodiment of the suspension system of the invention 224 shown in FIGS. 5 and 6, the front half of the suspension system extending from a vertical plane extending laterally through the center of the load compensator trunnion shaft is substantially identical to that of the first described embodiment and the reference numerals employed in identifying component parts of the forward half of the first embodiment of the suspension system are also employed to identify the identical component parts of the second embodiment of the suspension system shown in FIGS. 5 and 6. In describing the second embodiment of the suspension system of the invention, these identical component parts will not be again described.

Generally, the only component parts of the second embodiment of the suspension system that differ from those of the first embodiment are the load compensator 226 and an additional torque beam 232 that extends from the compensator rearwardly, or to the right as viewed in FIG. 5, and a second elastomeric spring 234. The hanger 12 is identical and the constructions of the torque beam and spring are substantially identical to those the torque beam 16 and spring 18 of the first embodiment and will be described here only briefly.

As in the first embodiment of the suspension system of the invention, the upper trunnion block portions 52, 64 and the lower trunnion block portions 54, 64 of the respective inboard and outboard hanger columns secure a trunnion pivot shaft 242 to the lower end of the hanger 12 in a position extending laterally across the open void 44 between the hanger columns 34, 36. A trunnion pivot bushing 244 is mounted on the trunnion shaft 242 intermediate the hanger columns 34, 36. The trunnion pivot bushing 244 is comprised of a rubber bushing 246 surrounding the trunnion shaft 242, and a metal sleeve or housing 248 surrounding the rubber bushing. As is best seen in FIG. 6, the opposite outboard and inboard ends of the trunnion shaft 242 are secured against rotation between the upper trunnion block portions 52, 64 and the lower trunnion block portions 54, 66 which are tightened around the trunnion shaft ends by respective threaded fasteners 56, 68.

The load compensator 226 has a symmetrical construction on opposite sides of a vertical plane extending laterally through the center of the compensator trunnion shaft 228. The load compensator 226 is secured to the exterior surface of the trunnion bushing sleeve 248 for pivoting movement about the center axis of the trunnion shaft relative to the hanger 12. As is best seen in FIG. 5, the compensator 226 is comprised of a generally rectangular shaped channel member formed in an inverted U-shaped configuration with opposing halves of the compensator on opposite sides of a vertical, lateral plane bisecting the hanger 12 being mirror images of each other. The compensator includes a top wall 252 and an outboard sidewall 254 and inboard sidewall 256 that enclose a hollow interior volume 258 of the compensator. A bottom wall section 262 is welded across the bottom edges of the compensator sidewalls and adds structural rigidity to the compensator. A plurality of reinforcing webs 264 are secured in the interior of the compensator to the compensator bottom wall 262 and between the opposed sidewalls 254, 256. The compensator sidewalls 254, 256 are secured on the trunnion pivot bushing sleeve 248 with the sleeve extending through coaxial openings (not shown) in the sidewalls.

The rearward end 266 of the load compensator 226, or the right hand end as viewed in FIG. 5, also has the same general inverted U-shaped configuration as the forward end of the compensator described in the description of the first embodiment of the invention. The configuration of the compensator rearward end allows access to the interior 258 through the open rearward end. In the preferred embodiment of the compensator, the rearward edges of the compensator outboard 254 and inboard 256 sidewalls are oriented at about a 60° angle relative to the compensator top wall 252 and relative to the longitudinal axis of the vehicle or chassis beam 28.

A compensator reaction plate 272 is welded to the rear edge of the compensator top wall 252 and sidewalls 254, 256 at an angular orientation of about 60° relative to a horizontal plane passing through the suspension assembly. A reinforcing flange 274 is secured across the top edge of the reaction plate and a plurality of reinforcing webs or gussets 276 extend between the reaction plate and the top wall and sidewalls of the compensator. Additional reinforcing webs 278 are secured to the sidewalls 254, 256 of the compensator adjacent the rearward compensator end and together with the reaction plate 272, the lateral flange 274, and the plurality of webs 276 reinforce and strengthen the rearward end of the compensator.

A torque beam pivot bushing assembly 282 is secured between the outboard 254 and inboard 256 compensator sidewalls Just rearward of and below the compensator trunnion shaft 242. The torque beam pivot bushing assembly 282 is conventional and is secured between the compensator sidewalls by a bolt and nut fastener assembly 284 inserted through coaxial holes (not shown) provided in the outboard and inboard compensator sidewalls. The bushing assembly 282 is substantially identical to the bushing assembly 132 of the first embodiment.

The rearward torque beam 232 is substantially identical to the torque beam of the first embodiment and is comprised of a top wall 292, opposite outboard and inboard sidewalls 294, and a bottom wall 296. The forward ends of the torque beam sidewalls 294, top wall 292 and bottom wall 296 are secured to a cylindrical sleeve 286 surrounding the bushing assembly 282 thereby providing a pivoting connection between the torque beam and the load compensator in the interior volume 258 of the compensator.

An inclined torque beam reaction plate 302 is secured to the torque beam in the same manner as the first described torque beam plate by a plurality of web members 304 welded between the underside of the reaction plate and the top wall of the torque beam. The torque beam reaction plate is secured to the torque beam in an angled orientation of about 60° to a horizontal plane passing through the centers of the pivot mountings of the rear axle seat 108, the bushing assembly 282, and the forward axle seat bushing 184.

The spring 234 is identical to the spring 18 described in the first embodiment of the invention except that its orientation relative to the compensator 226 and the rear torque beam 232 is reversed from that of the forward spring 18. The spring 234 is secured between the compensator reaction plate 272 and the torque beam reaction plate 302 as in the first described embodiment. The construction of the spring 234 is identical to that described earlier with reference to FIG. 7 in the first embodiment of the invention. The operation of the spring 234 is also identical to that described earlier with reference to the spring 18 of the first embodiment.

The rearward end of the torque beam 232 opposite its pivot bushing connection to the compensator 226 is connected with a hollow tubular sleeve 312 having a center axis oriented laterally relative to the vehicle chassis. A pivot bushing assembly 314 is inserted in the interior of the sleeve 312 with opposite lateral ends of a pivot pin 316 of the bushing assembly projecting from opposite lateral ends of the sleeve. The bushing assembly 314 is conventional and is substantially identical to the bushing assembly 184 of the first embodiment.

The rearward axle seat assembly 108 is secured to the opposite lateral ends of the pivot bushing pin 316 projecting beyond the opposite lateral ends of the rear torque beam sleeve 312. The axle seat assembly 108 is substantially identical to the forward axle seat assembly 194 of the first embodiment described earlier.

A shock absorber 322 is pivotally connected to the torque beam 232 and the hanger 12 in the same manner as shock absorber 222. The pivoting connections of the opposite ends of the shock absorber 322 between the torque beam and hanger are conventional.

In both of the above described embodiments of the invention the positioning of the elastomeric springs entirely outside the interior volume of the compensators enables them to have a wider lateral width than the compensator's interior volumes. Furthermore, the trapezoidal configuration of the rubber blocks of each spring and the positioning of each spring at an angle relative to the longitudinal axis of the torque beam and the longitudinal axis of the vehicle chassis enables the spring to better resist compression and shear forces exerted on the spring due to pivoting movement of the torque beam relative to the compensator without the need for providing the suspension systems with the addition of torque rods or secondary springs which were required by prior art compensator type tandem axle vehicle suspensions. The angled orientation of the springs relative to their associated torque beams and compensators enable the springs to distribute forces exerted on them by the beams and compensators in any range for example a range of about 60 percent in compression and 40 percent in shear to about 40 percent in compression and 60 percent in shear, and preferably 50 percent in compression and 50 percent in shear. The configuration of the spring blocks, the angled orientation of the springs relative to the vehicle and the torque beam longitudinal axes, together with the increased lateral width dimensions of the springs enabled by their being positioned entirely outside the interior volumes of the load compensators enable the single springs associated with each torque beam of the two embodiments to perform the functions that heretofore have been performed by both a primary and secondary spring assembled between the torque beams and compensator or of a primary spring and torque rod.

The positioning of the springs entirely outside the interior volumes of the compensators overcomes the difficulty associated with performing maintenance and repairs to the springs of prior art suspension systems that are confined in the interiors of the systems load compensators and are not easily accessible. Prior art suspension systems often require the removal of the torque beam to access or perform maintenance on the system's springs. The exposed springs of the present invention are easily accessible and it is not necessary to remove the torque beam to perform maintenance on the springs. Furthermore, prior art suspension systems confining the springs in the interiors of the torque beams put a size limitation on the springs. Increasing the vertical height of the spring would often result in its lateral buckling in use presenting the danger of damaging the vehicle axles. The limited lateral width of the compensator interior prevented the use of a spring having a lateral width larger than that of the compensator interior. This resulted in prior art suspension systems being limited to applications of up to a particular load dictated by the size limitations placed on the springs. For different load applications up to the maximum load limited by the lateral width of the prior art springs, prior art suspension systems were still disadvantaged in using the same suspension system for a variety of different load applications by the difficulty of accessing the spring in the interiors of the compensators to change springs for different loads. The novel suspension system of the present invention overcomes all of these disadvantages associated with prior art compensator type suspension systems by providing a compensator suspension system where the spring is not confined within the interior of the compensator but is entirely exposed and easily accessible. This construction of the suspension system where the size of the spring is not limited by the confined interior volume of the compensator and is easily accessible for making adjustments and changes for varying load applications enables the same suspension system of the invention to be modified to suit it to a variety of different load applications by simply changing the spring of the system or changing the orientation of the spring relative to the torque beam or beams. For increasing loads the lateral width dimensions of the spring, the configurations of the spring blocks or the number of the spring blocks, and the number of the metal plates between adjacent spring blocks may be easily varied to best suit the suspension system for any particular load. Furthermore, the orientation of the compensator reaction plate and the orientation of the torque beam reaction plate relative to a horizontal plane passing through the system may be easily changed to further adjust the suspension system to suit varying load applications. With the compensator and torque beam reaction plates being mounted in exposed positions, existing plates may be removed and retrofit with different compensator and torque beam reaction plates oriented at different angles relative to the horizontal plane passing through the suspension system to further adjust the suspension system for different load applications. Employing the same spring without making changes to the spring, the same suspension system can be adjusted for lesser load applications by replacing the existing compensator and torque beam reaction plates with compensator and torque beam reaction plates oriented at a larger angle relative to the horizontal plane passing through the suspension system. This will result in a greater portion of the load supported by the suspension system exerting a shear force on the spring and a lesser portion exerting a compression force, thereby enabling the spring to deflect more and softening the ride of the suspension system for the lesser load. Conversely, with increasing loads supported by the same suspension system and without changing the spring or the material of the spring, by removing the compensator and torque beam reaction plates and replacing them with a compensator and reaction plate both oriented at a lesser angle relative to the horizontal plane passing through the suspension system a greater portion of the vehicle load exerts a compression force on the spring and a lesser portion exerts a shear force on the spring. This results in decreasing the deflection of the spring and provides more rigid or firm support for heavier vehicle loads. In this manner, the suspension system of the invention is easily adjusted to enable its use in a variety of varying load applications without changing the spring of the suspension system and by merely adjusting the inclination of the compensator and torque beam reaction plates relative to the horizontal plane passing through the suspension system.

As described above, the novel suspension system of the invention enables the single suspension system to be used for a variety of varying load applications by changing the orientation of the spring relative to the horizontal plane passing through the system by changing the inclinations of the compensator and torque beam reactions plates, and/or by changing the spring or springs by varying the number of rubber blocks or their configuration, by changing the material of the rubber blocks, or by varying the number of metal plates between adjacent blocks. In this manner, the novel configuration of the suspension system of the invention provides a ride for varying different load applications comparable to that of an air ride suspension system without the use of air springs.

The connections of the torque beam or beams to the compensator and to the vehicle axles at their opposite ends by the resilient bushing assemblies enable the wheels of the vehicle's tandem axles to automatically track around curves and turns. The resiliency of the bushing assemblies connecting the torque beam or beams to the compensator and their positioning on opposite longitudinal sides and below the pivot trunnion of the compensator causes reactive moments and forces exerted on the torque beam by stopping and starting of the vehicle to tend to drive the compensator downward, thereby avoiding axle wind up or brake hop. The relative positions of the pivoting bushings between the torque beam or beams and the compensator, and the positions of the springs relative to the torque beam or beams and the compensator results in the torque beam and/or compensator applying both a compressive and shear force to the springs in response to pivoting movement of the torque beam or compensator due to changes or shifts in the vehicle load or due to movement of the vehicle axles over uneven road surfaces. Due to the unique configuration of the embodiments of the suspension system, the ratio of compression and shear forces exerted on the springs is at least 50/50. The independent oscillating of the compensator relative to the torque beam also equalizes the load distribution of the vehicle between the two axles. The larger spring width allowed by the configuration of the suspension system avoids lateral buckling of the springs and its detrimental effect on the vehicle axles associated therewith. In addition, the positioning of the springs entirely outside the compensator enables the springs to be easily installed and removed and also enables springs of even larger lateral widths to be installed in the suspension system to handle larger vehicle loads. Overall, the novel configuration of the suspension system provides a more stable vehicle ride.

Still further, the unique configuration of the embodiments of the invention disclosed above prevents the tendency of the wheels of prior art tandem axle vehicle suspensions to dig themselves in when operated over soft ground. In prior art tandem axle suspension systems employing a bogie or truck connecting the two axles together so that one wheel on one axle is caused to move upward when a second wheel on the second axle moves downward, the wheels of the tandem axle system have a tendency to dig themselves in when operated over soft ground. For example, in the prior art tandem axle suspension system, if the wheels of the front axle of the system begin to sink through soft ground such as mud or sand the wheels of the rear axle of the system are caused to move upward due to the pivoting movement of the bogie or truck relative to the suspension system's hanger. As the rear axle pivots upward, more and more of the vehicle's load is distributed to the front axle thereby causing the wheels of the front axle to sink even further into the soft ground.

The configuration of the two embodiments of the suspension system of the invention described above overcome this problem of prior art tandem axle suspensions. In either of the two embodiments described above, if the wheels of the front axle of the suspension system begin to sink into soft ground the system hanger and compensator will also move downward with the front axle. These movements will cause the torque beam connected to the sinking front axle to pivot relative to the compensator in a direction toward the compensator, thereby causing the spring of the front axle torque beam to exert an upward force on the forward end of the compensator. The force exerted by the spring on the forward end of the compensator causes the compensator to rotate about its trunnion pivot connection to the hanger and thereby causes the rearward end of the compensator to move downward. The downward movement of the compensator rearward end moves the rear axle downward in the first described embodiment, or exerts a force on the spring of the rear axle torque beam pushing the torque beam and the rear axle downward in the second embodiment. The downward movement of the rear axle and its wheels caused by the compensator provides more tractive force to the rear wheels and also causes the rear wheels to lift the forward wheels out of the ground. In this manner the configurations of the suspension systems of the two embodiments of the invention prevent the wheels of either the front axle or the rear axle from digging themselves in in soft ground, mud or sand.

While the present invention has been described by reference to specific embodiments, it should be understood that modifications and variations of the invention may be constructed without departing from the scope of the invention defined in the following claims.

What is claimed is:

1. A tandem axle suspension system for a vehicle having a chassis supported by at least two vehicle axles, the suspension system comprising:
   a hanger adapted to be secured to a vehicle chassis;
   a load compensator connected to the hanger for pivoting movement of the compensator relative to the hanger about an axis generally parallel to the axles of the vehicle, the compensator having a hollow interior;
   a first torque beam having longitudinally opposite first and second ends, the first end of the torque beam being adapted to be connected to one of the vehicle axles and the second end of the torque beam being connected to the compensator for pivoting movement of the torque beam relative to the compensator; and,
   an elastic member connected to both the torque beam and the compensator, the elastic member being positioned entirely outside the hollow interior of the compensator where a lateral width dimension of the elastic member is not limited by a lateral width dimension of the load compensator hollow interior enabling the elastic member to be replaced with like elastic members having varying lateral width dimensions to adjust the suspension system for varying vehicle loads, including replacing the elastic member with a like elastic member having a lateral width dimension larger than the lateral width dimension of the load compensator hollow interior.

2. The suspension system of claim 1, wherein:
   the elastic member is connected between the torque beam and the load compensator in an orientation of the elastic member relative to the torque beam and load compensator that distributes forces exerted on the elastic member by the torque beam and the load compensator to about one half of the force in compression and about one half of the force in shear, whereby the distribution of forces exerted on the elastic member can be adjusted by varying the orientation of the elastic member relative to the torque beam and load compensator.

3. The suspension system of claim 1, wherein:
   the elastic member is a spring having opposite first and second ends with the first spring end being connected to the torque beam at an angular orientation relative to the torque beam and the second spring end being connected to the compensator at an angular orientation relative to the torque beam, where the suspension system can be adjusted for supporting varying different vehicle loads by varying the angular orientations at which the spring first and second ends are connected to the torque beam and compensator, respectively, relative to the torque beam.

4. The suspension system of claim 1, wherein:
   the elastic member is a spring connected between the torque beam and the compensator, and the spring is the sole spring connected between the torque beam and compensator that is alternately pressed in compression and pulled in tension in response to the torque beam pivoting in opposite first and second directions relative to the compensator, respectively.

5. The suspension system of claim 1, wherein:
   the elastic member is an elastomeric spring comprised of a plurality of metal plates, with adjacent pairs of plates being separated by a block of elastomeric material, whereby the suspension system can be adjusted for supporting a variety of different vehicle loads by varying the size and number of elastomeric blocks.

6. The suspension system of claim 1, wherein:
   the load compensator has opposite first and second ends spaced longitudinally on opposite sides of the connection of the compensator to the hanger, the torque beam is connected to the first end of the compensator and the elastic member is connected to the first end of the compensator.

7. The suspension system of claim 1, wherein:
   the hanger is formed with a pair of laterally spaced columns having a void therebetween, and the compensator is connected to the hanger positioned in the void between the hanger columns.

8. The suspension system of claim 1, wherein:
   the compensator is adapted to be connected to a second of the vehicle axles, where the one vehicle axle and the second vehicle axle are positioned on longitudinally opposite sides of the hanger.

9. The suspension system of claim 1, wherein:
   a second torque beam having longitudinally opposite first and second ends is connected to the load compensator, the second end of the second torque beam being adapted to be connected to a second of the vehicle axles and the first end of the second torque being connected to the compensator for pivoting movement of the second torque beam relative to the compensator;

and a second elastic member is connected to both the second torque beam and the compensator, the second elastic member being positioned entirely outside the hollow interior of the compensator.

10. The suspension system of claim 9, wherein:
the hanger is formed with a pair of laterally spaced columns having a void therebetween, and the compensator is connected to the hanger positioned in the void between the hanger columns with the hanger columns extending over opposite lateral sides of the compensator.

11. The suspension system of claim 10, wherein:
first means are provided in the interior of the load compensator for pivotally connecting the second end of the first torque beam to the load compensator inside the compensator interior, and second means are provided in the interior of the load compensator for pivotally connecting the first end of the second torque beam to the load compensator inside the compensator.

12. The suspension system of claim 3, wherein:
the spring is comprised of a plurality of metal plates and a plurality of elastomeric blocks, with adjacent pairs of plates being separated by a block and wherein the elastomeric blocks each have a configuration that positions adjacent metal plates at an angle to each other.

13. A tandem axle suspension system for a vehicle having a chassis and at least two vehicle axles extending laterally beneath the chassis, the suspension system comprising:
a hanger having opposite top and bottom sections, the top section of the hanger being configured to be attached to a vehicle chassis and the bottom section of the hanger being configured as two downwardly depending, laterally spaced hanger columns having an open void therebetween;
a load compensator having longitudinally opposite first and second ends, the load compensator being positioned extending longitudinally through the void between the hanger columns with the hanger columns extending downward on opposite lateral sides of the load compensator and with the first and second ends of the compensator positioned on opposite longitudinal sides of the hanger columns;
means for connecting the load compensator to the hanger columns for pivoting movement of the compensator relative to the columns;
at least one torque beam having longitudinally opposite first and second ends, the first end of the torque beam being configured to be attached to one vehicle axle and the second end of the torque beam being configured to be attached to the load compensator;
means for connecting the second end of the torque beam to the first end of the load compensator for pivoting movement of the torque beam relative to the load compensator; and,
an elastic member having opposite first and second ends, the first end of the elastic member being connected to the torque beam and the second end of the elastic member being connected to the first end of the compensator.

14. The suspension system of claim 13, wherein:
a first axle seat for supporting a vehicle axle is connected to the first end of the torque beam and a second axle seat for supporting a second vehicle axle is connected to the second end of the load compensator.

15. The suspension system of claim 13, wherein:
the elastic element is an elastomer spring having opposite first and second end surfaces that are generally parallel to each, the first end surface is connected to the torque beam and the second end surface is connected to the first end of the compensator in positions where the first and second end surfaces are oriented at angles relative to a longitudinal axis of the vehicle chassis, whereby the suspension system can be adjusted for supporting varying different vehicle loads by varying the angles at which the first and second end surfaces are oriented connected to the torque beam and compensator, respectively, relative to the longitudinal axis.

16. The suspension system of claim 15, wherein:
the spring is comprised of a plurality of metal plates and a plurality of elastomeric blocks, with adjacent pairs of plates being separated by a block and wherein the elastomeric blocks each have a configuration that positions adjacent metal plates at an angle to each other.

17. The suspension system of claim 13, wherein:
the elastomer spring is comprised of a plurality of metal plates, with adjacent pairs of plates being separated by a block of elastomeric material, whereby the suspension system can be adjusted for supporting a variety of different vehicle loads by varying the size and number of the elastomeric blocks.

18. The suspension system of claim 15, wherein:
the elastomer spring has a lateral width that is larger than a lateral width of the load compensator.

19. The suspension system of claim 13, wherein:
the load compensator is comprised of a pair of laterally spaced sidewalls and has a hollow interior between the sidewalls, the sidewalls extend longitudinally between the first and second ends of the compensator;
the second end of the torque beam extends into the interior of the compensator and is positioned between the pair of sidewalls; and,
the means for connecting the second end of the torque beam to the first end of the compensator connects the torque beam second end to the pair of sidewalls between the pair of sidewalls.

20. The suspension system of claim 19, wherein:
the elastic member is connected to both the torque beam and the pair of sidewalls of the compensator and is positioned entirely outside the interior of the compensator.

21. The suspension system of claim 20, wherein:
the elastic member is an elastomer spring having a lateral width that is larger than a lateral width of the compensator interior between the pair of sidewalls.

22. The suspension of claim 19, wherein:
a first axle seat for supporting a vehicle axle is connected to the first end of the torque beam and a second axle seat for supporting a second vehicle axle is connected to the pair of compensator sidewalls at the second end of the load compensator.

23. The suspension system of claim 13, wherein:
a second torque beam having longitudinally opposite first and second ends is connected to the load compensator, the second end of the torque beam is configured to be attached to a second vehicle axle and the first end of the torque beam is configured to be attached to the load compensator, and means are provided for connecting the first end of the second torque beam to the second end of the load compensator for pivoting movement of the second torque beam relative to the load compensator; and, a second elastic member having opposite first and second ends is connected between the second torque beam and the load compensator, the first end of the second elastic member being connected to the second end of the load compensator and the second end of the second elastic member being connected to the second torque beam.

24. The suspension system of claim 23, wherein:

the load compensator is comprised of a pair of laterally spaced sidewalls and has a hollow interior between the sidewalls, the sidewalls extend longitudinally between the first and second ends of the compensator;

the first end of the second torque beam extends into the interior of the compensator and is positioned between the pair of sidewalls; and, the means provided for connecting the first end of the second torque beam to the second end of the load compensator connects the second torque beam first end to the pair of sidewalls between the sidewalls.

25. The suspension system of claim 24, wherein:

the second elastic member is connected to both the second torque beam and the pair of sidewalls of the compensator and is positioned entirely outside the interior of the compensator.

26. The suspension system of claim 25, wherein:

the second elastic member is an elastomer spring having a lateral width that is larger than a lateral width of the compensator interior between the pair of sidewalls.

\* \* \* \* \*